United States Patent
Dixon et al.

(10) Patent No.: US 8,667,100 B2
(45) Date of Patent: Mar. 4, 2014

(54) DEVICE COMMUNICATION, MONITORING AND CONTROL ARCHITECTURE AND METHOD

(75) Inventors: Christopher Dixon, Merion Station, PA (US); James Poder, Cheltenham, PA (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 60 days.

(21) Appl. No.: 12/831,600

(22) Filed: Jul. 7, 2010

(65) Prior Publication Data
US 2012/0011233 A1 Jan. 12, 2012

(51) Int. Cl.
*G06F 15/177* (2006.01)
*G06F 15/173* (2006.01)

(52) U.S. Cl.
USPC ............................ 709/221; 709/223; 709/224

(58) Field of Classification Search
USPC ............ 379/102.01, 102.02, 90.01; 340/12.3, 340/12.31, 500, 505; 709/221, 223, 224
See application file for complete search history.

(56) References Cited

U.S. PATENT DOCUMENTS

| | | | | |
|---|---|---|---|---|
| 5,051,720 A | * | 9/1991 | Kittirutsunetorn | 340/12.33 |
| 5,061,916 A | * | 10/1991 | French et al. | 340/522 |
| 6,085,236 A | * | 7/2000 | Lea | 709/220 |
| 6,278,697 B1 | * | 8/2001 | Brody et al. | 370/310 |
| 6,389,466 B1 | * | 5/2002 | Zondag | 709/221 |
| 6,546,419 B1 | * | 4/2003 | Humpleman et al. | 709/223 |
| 6,892,230 B1 | * | 5/2005 | Gu et al. | 709/220 |
| 7,142,128 B2 | * | 11/2006 | Kobayashi | 709/218 |
| 7,876,722 B2 | * | 1/2011 | Hodson et al. | 370/328 |
| 2003/0035523 A1 | * | 2/2003 | Mansfield | 379/93.07 |
| 2003/0101459 A1 | * | 5/2003 | Edson | 725/82 |
| 2004/0139210 A1 | * | 7/2004 | Lee et al. | 709/230 |
| 2006/0020690 A1 | * | 1/2006 | Richards et al. | 709/221 |
| 2006/0227946 A1 | * | 10/2006 | Henderson | 379/100.01 |
| 2006/0256813 A1 | * | 11/2006 | Brusca et al. | 370/466 |
| 2007/0124786 A1 | * | 5/2007 | Kim et al. | 725/105 |
| 2007/0162586 A1 | * | 7/2007 | Kim | 709/223 |
| 2008/0103608 A1 | * | 5/2008 | Gough et al. | 700/1 |

(Continued)

FOREIGN PATENT DOCUMENTS

| | | | | |
|---|---|---|---|---|
| JP | 2001251312 A | * | 9/2001 | H04L 12/28 |
| JP | 2006178976 A | * | 7/2006 | |
| JP | 2010183204 A | * | 8/2010 | |

OTHER PUBLICATIONS

Extended European Search Report—EP11172003—Mailing Date: Feb. 19, 2013.

*Primary Examiner* — Kostas Katsikis
(74) *Attorney, Agent, or Firm* — Banner & Witcoff, Ltd.

(57) ABSTRACT

A communication interface and a device control, management and monitoring system are provided to enable the networking of and communication between a multiple devices operating under different protocols. The communication interface may act as a translator or protocol converter that reformats transmissions from one protocol to another based on protocol compatibility between the recipient and transmitting devices. The device control and monitoring system may store predefined rules that are triggered when specified conditions associated with the networked devices are detected. The rules may specify an action to take such as transmitting a discount offer to a user or turning off a light. According to one or more arrangements, the communication interface may act as an intermediary between the networked devices and the device control system so that the device control system is not required to understand or be compatible with the various other protocols used by the networked devices.

20 Claims, 7 Drawing Sheets

(56) References Cited

U.S. PATENT DOCUMENTS

| | | | |
|---|---|---|---|
| 2008/0104272 A1* | 5/2008 | Morris | 709/238 |
| 2008/0288618 A1* | 11/2008 | Vardi et al. | 709/223 |
| 2009/0086940 A1 | 4/2009 | Diethorn et al. | |
| 2009/0150921 A1* | 6/2009 | Naylor et al. | 725/24 |
| 2009/0197524 A1 | 8/2009 | Haff et al. | |
| 2009/0207893 A1* | 8/2009 | Leutgeb et al. | 375/219 |
| 2010/0013607 A1* | 1/2010 | Sabo et al. | 340/286.06 |
| 2010/0217837 A1* | 8/2010 | Ansari et al. | 709/218 |
| 2011/0046799 A1* | 2/2011 | Imes et al. | 700/286 |

* cited by examiner

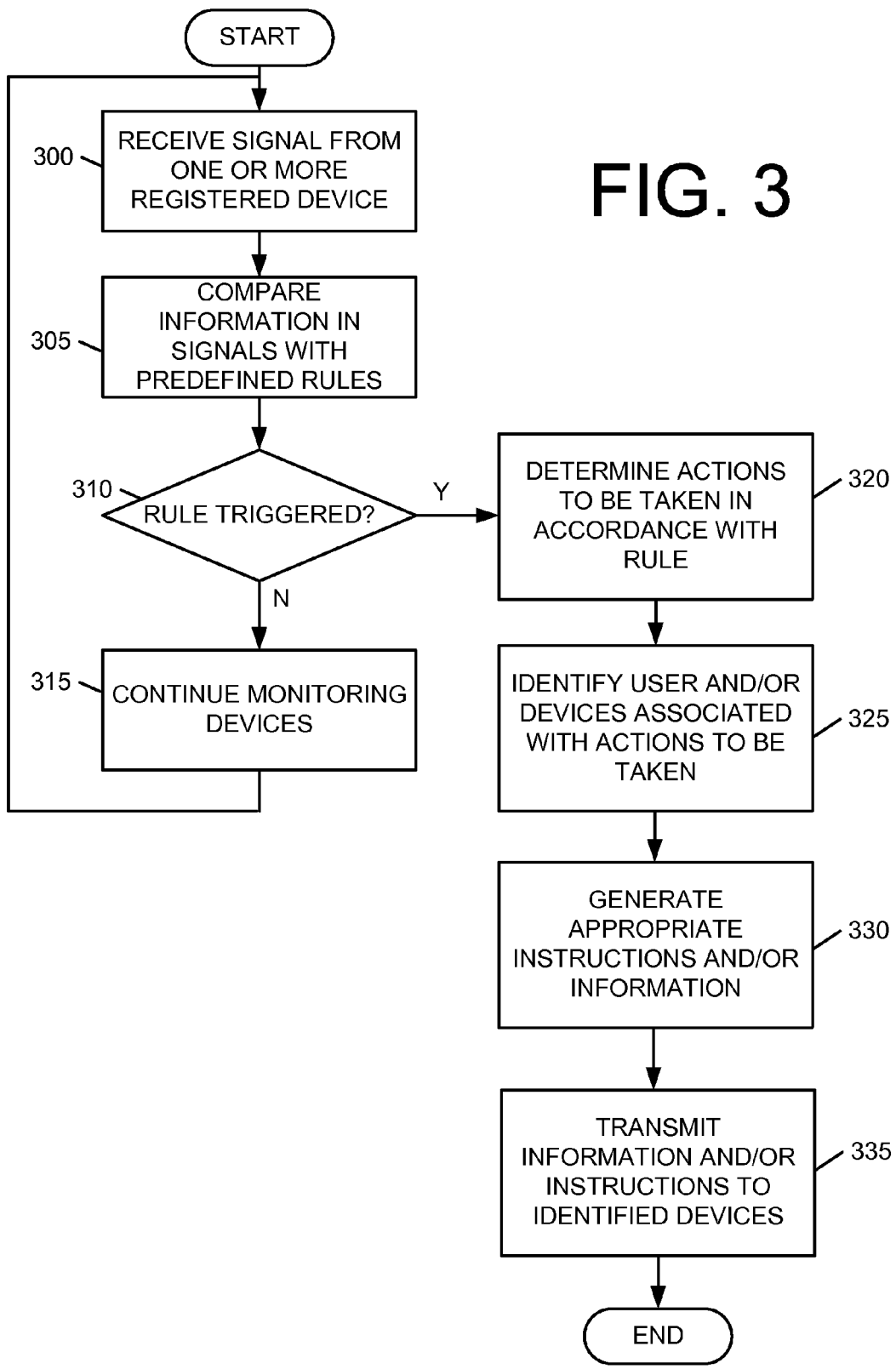

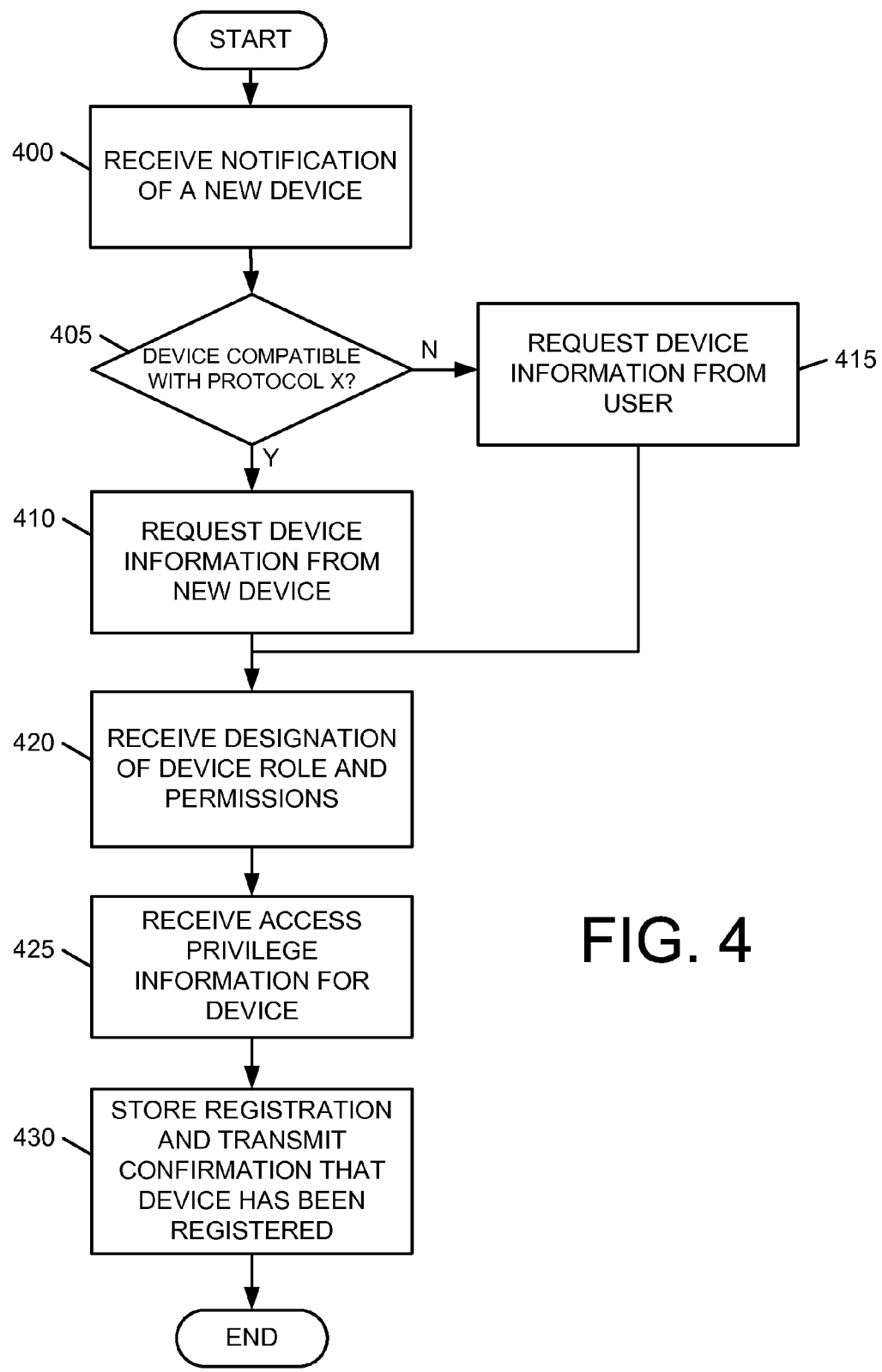

NEW DEVICE REGISTRATION

Device Name: [_____] — 501  500
503
Device Type: [_____] [browse] — 507a
505
Device Driver: [_____] [browse] — 507b Compatible Protocols: — 509

| XMPP        511 |
| TCP/IP |
| Z-WAVE |
| Remote DVR Programming Protocol |

[reset] — 513
[save] [continue]
  515    517

NEW DEVICE CONFIGURATION

521
Device Role: [ Both ▽ ]    520
             [ Sender   ]
             [ Receiver ]
             [ Both     ]

Permissions: — 523
529 ⎯ ☐ Device 1   [modify] — 527
      ☐ Device 2   [modify]
                    525b
      525a
531 — [add]

[reset] [save] [continue]

FIG. 5B

DEVICE COMMUNICATION, MONITORING AND CONTROL ARCHITECTURE AND METHOD

TECHNICAL FIELD

Aspects of the disclosure relate to providing a communication interface for multiple devices. In particular, aspects describe an interface configured to facilitate communications with a variety of devices.

BACKGROUND

Today, device to human and vice versa interaction is performed through specialized interfaces written specifically for a particular device. This typically requires specific interfaces for each device when communicating between one device and multiple other devices. For example, in order to command or interact with 5 different devices, a user or device may require 5 different interfaces that are each programmed to be compatible with a corresponding device. This often results in devices not being able to communicate with one another due to a lack of interfacing capability and compatibility or having to have multiple interfaces to provide such compatibility.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a communication interface is provided to facilitate communication between multiple similar and different devices. While each of the devices may operate under a different set of protocols, the communication interface may be configured to convert or reformat transmissions into a protocol that is compatible with a particular device. In one or more arrangements, the communication interface may allow several home or user devices to communicate with one another and to send and receive information to and from a device control system. For example, microwave status information may be sent to a set-top box that is configured to display the microwave information (e.g., if cooking is completed) on a display so that a user does not need to leave the display to check on the microwave. In another example, an indoor thermostat setting may be controlled through a user's cell phone or through the television.

According to another aspect, a device control system may perform a predefined action such as controlling the operation of devices based on detected conditions. For example, a device control system may automatically lower electronic blinds in a home upon detection that a movie has begun playing (or is about to begin playing) based on status information received from a DVD player or television. In another example, a device control system may be configured to automatically transmit discount offers to a user upon detecting a user's electricity usage being above average. The device control system may detect such conditions based on signals and information received from a variety of devices such as thermostats, doors, motion sensors, home appliances, display devices, mobile devices and the like. The signals from these devices may first be converted to a protocol compatible with the device control system by the communication interface. In one or more arrangements, the device control system may reside at a service provider's location.

According to yet another aspect, a communication interface may serve as a network interface, creating a network between devices that might otherwise not have the capability to communicate with one another. The communication interface may further collect device information and send an aggregation of the information to another device for processing.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 3 is a flowchart illustrating an example method for controlling one or more devices according to one or more aspects described herein.

FIG. 4 is a flowchart illustrating an example method for registering a device with a communication interface and/or a device control system according to one or more aspects described herein.

FIGS. 5A & 5B illustrate user interfaces that may be used to register and configure devices according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present disclosure.

Figure 1:
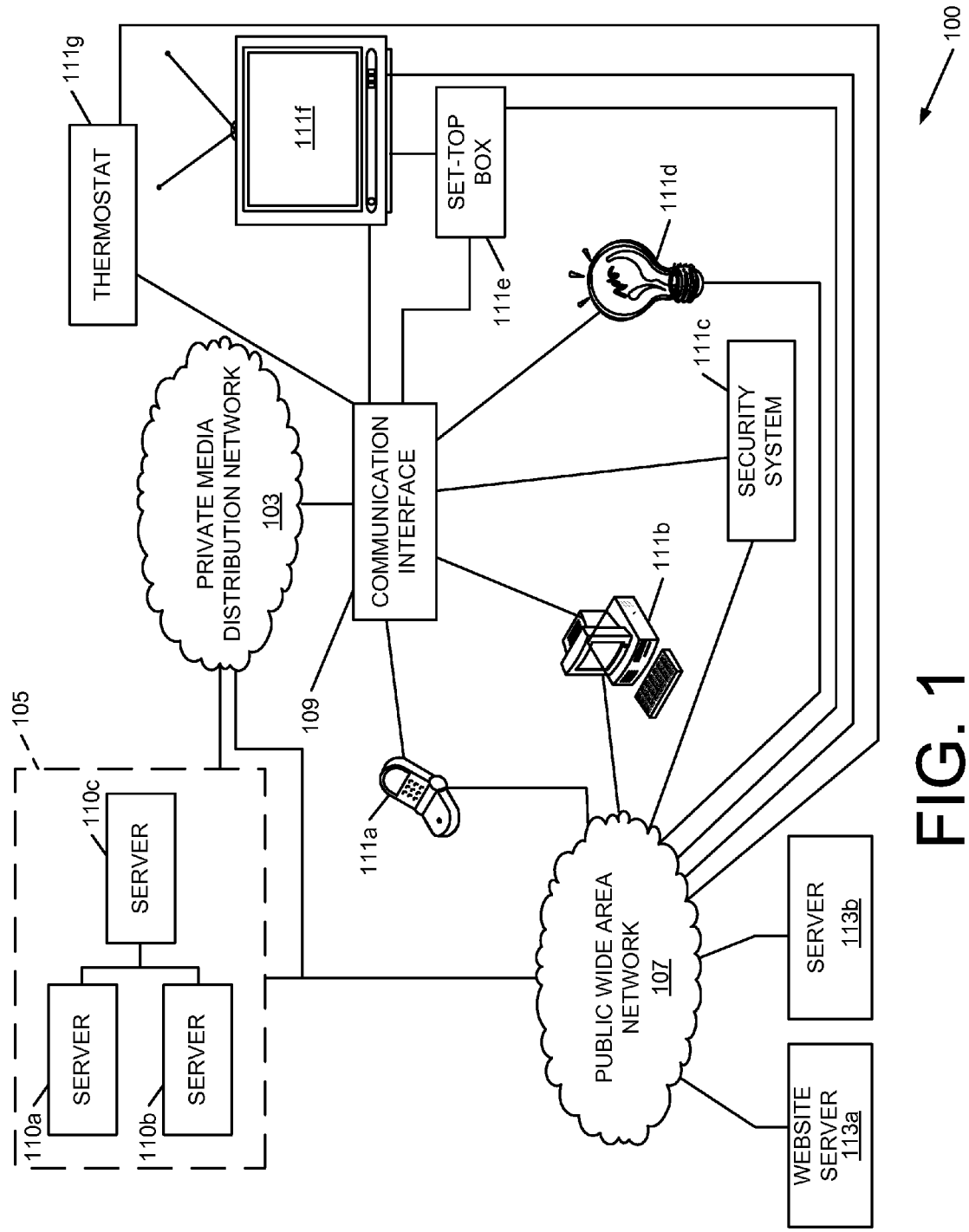
FIG. 1 illustrates an example network environment according to one or more aspects described herein.

FIG. 1 illustrates a network environment 100 that may be used in connection with one or more aspects described herein. The network environment 100 may include a private media distribution network 103 connecting a service provider network 105 with one or more client devices 111. Private media distribution network 103 may, in one or more arrangements, require a subscription to the services provided by service provider network 105 to access the content, services and other data offered therethrough. Private media distribution network 103 may, in one or more alternative or additional arrangements, enforce access restriction based on location, size, demographics, user information and the like. For example, a private media distribution network 103 may be defined as a network within an office building or home. In another example, private media distribution network 103 may be defined as a network including no more than 100 users. In yet another example, private media distribution network 103 may be defined based on boundaries of a physical network infrastructure or by users that pay or subscribe to a particular service. Combinations of factors may also be used. For example, private media distribution network 103 may be configured to include the first 100 users logged in from an office building or other specified location (e.g., a café). Alternatively, network 105 may be a free or public network that users may access without subscriptions or other types of payment.

According to one or more aspects, a service provider (e.g., of service provider network 105) may provide subscriber devices such as client devices 111a, 111b and/or 111e, and provide such devices with access to a local or wide area network such as the Internet. Thus, client devices 111a, 111b and/or 111e may request information from servers and devices including website server 113a and content server 113b through media distribution network 103 and service provider network 105. Service provider network 105 may comprise a single distribution system or may include multiple systems having servers 110. In one example, private media distribution network 103 may comprise a wireless, coaxial, cable and/or fiber optic (or a hybrid combination thereof) network configured to facilitate communication of data, messages, content, commands and other information between client devices 111 and service provider network 105. For example, network 103 may comprise optical connections between a service provider and an external unit (e.g., a signal amplifier) of a user location. Connections between the external unit and devices within the user location or premises may comprise coaxial wires or lines. The network may, alternatively, be configured such that the service provider transmits data over coaxial wiring to an amplifier or node and subsequently over fiber optic from the amplifier or node to individual user locations (e.g., if the node or amplifier is configured to service multiple user locations). Portions of a network may further comprise satellite connections or wireless connections (e.g., WiMAX, cellular, 802.11). For example, a content provider may receive content and other data through satellite communications and deliver it to users through the same, different or a combination of communication mediums. Alternatively or additionally, client devices 111 may have direct connections to other networks such as wide area network 107. Accordingly, client devices 111 may access website server 113a through a direct connection to wide area network 107 rather than through private media distribution network 103.

Client devices 111 may include a wide variety of systems including, for example, mobile communication device 111a, personal computer 111b, security system 111c, lighting systems/devices 111d, set-top boxes 111e, televisions 111f, thermostats 111g and the like. Each of client devices 111 may communicate using a different protocol. For example, mobile communication device 111a may send and receive data using TCP/IP while lighting systems/devices 111d may transmit status signals using Extensible Messaging and Presence Protocol (XMPP). In yet other examples, security system 111c may be configured to communicate using ZIGBEE protocol while thermostat 111g may be configured to communicate using SIP/SIMPLE (Session Initiation Protocol for Instant Messaging and Presence Leveraging Extensions). Other device control and communication protocols may include Ethernet, HOMEPLUG (IEEE P1901), Universal Powerline Bus (UPB), BLUETOOTH, IRDA (Infrared Data Association) and the like. Accordingly, in one or more arrangements, private media distribution network 103 may include a communication interface 109 that acts as a single interface and protocol conversion system for these wired and wireless client devices 111 that may use differing communication protocols. For example, communication interface 109 may be compatible with all of the various protocols used by client devices 111 and provide protocol conversion functionality so that client devices 111 may communicate with one another and with service provider network 105 without having to understand the other protocols.

Using the communication interface 109, a user may thus turn off lighting system 111d using mobile communication device 111a by sending an instruction from device 111a to communication interface 109, which may then convert the instruction to a protocol understood by lighting system 111d and forwarding the instruction to lighting system 111d. Moreover, communication interface 109 may be configured to identify the protocol in which communication and/or data is sent or received and to convert the data and information to a protocol compatible with one or more systems of service provider network 105. Such conversion may allow the one or more systems of service provider network 105 to monitor and control devices 111. For example, a service provider may automatically control lighting (e.g., dimming or brightening) in a user's home in response to determining that the user has ordered and/or begun playing a movie. Other examples and details of device control are described herein. Alternatively or additionally, data and information received from the service provider network 105 that is to be sent to one or more of devices 111 may be converted by communication interface 109 in accordance with one or more protocols understood by the one or more of devices 111. The above described configuration and network environment 100 thus allows for, according to one or more aspects, the remote control, management and monitoring of devices 111 by service provider network 105. For example, devices 111 may comprise a plurality of home and user devices such as home appliances, utility systems, consumer electronics and the like. In one or more arrangements, devices 111 may comprise customer premises equipment that are located within a single location associated with a customer or user. Customer premises may include an office, office building, areas within the office (e.g., floors), a user's home, rooms within the home and the like. The status and operation of such devices (e.g., an operation parameter of a device) may thus be controlled and monitored by service provider network 105 or the user for further home automation.

Figure 2:
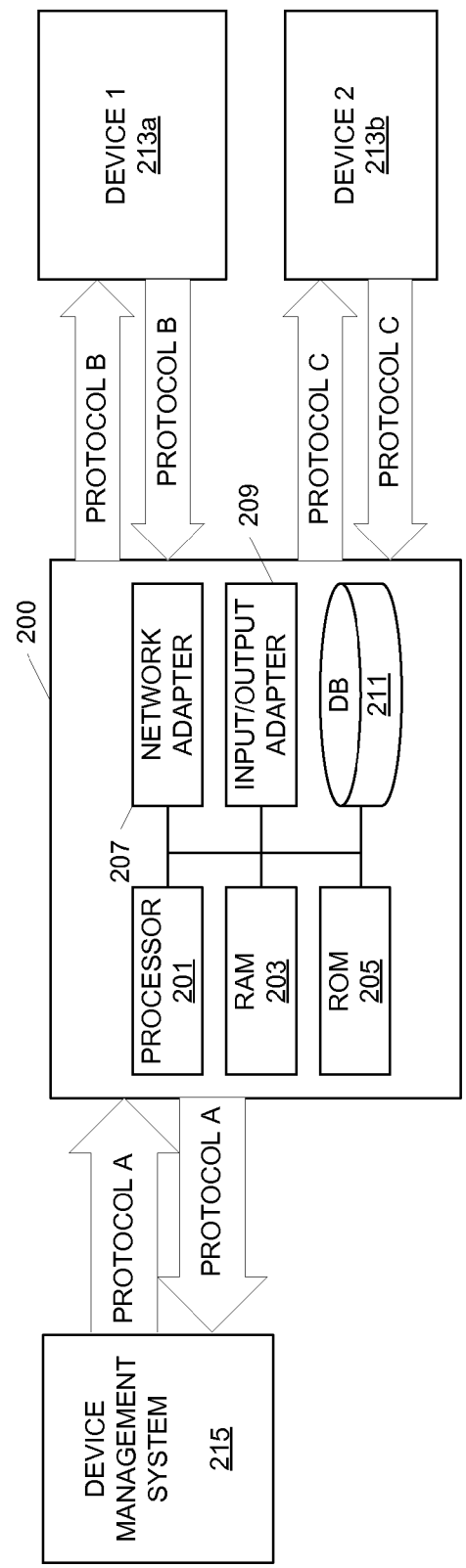
FIG. 2 illustrates a device management system and communication interface according to one or more aspects described herein.

FIG. 2 illustrates a computing system 200 that may be used in the network environment 100 of FIG. 1. In one example, computing system 200 may operate as a communication interface (e.g., interface 109 of FIG. 1). Computing system 200 may include a processor 201, random access memory (RAM) 203, read only memory (ROM) 205, network adapter 207, input/output adapter 209 and database 211. Processor 201 may operate to perform mathematical calculations and other processes to assist in the execution of computer executable instructions. RAM 203 and ROM 205 may be configured to temporarily or permanently store the computer executable instructions for retrieval and execution. Network adapter 207 is configured to facilitate communication over various types of networks with one or more other devices such as devices 213. In one or more arrangements, the network adapter 207 may be compatible with and configured to communicate in multiple communication protocols such as TCP/IP, ZIGBEE, SIP/SIMPLE, HOMEPLUG and/or XMPP. Input/output adapter 209 may be configured to receive data from various input devices such as keyboards, mice, styluses, microphones, video cameras and the like. Input/output adapter 209 may further be configured to output data to one or more output devices (not shown) such as displays, speakers, tactile feedback devices and the like.

Operating as a gateway or communication interface such as interface 109 of FIG. 1, computing system 200 may be configured to convert signals from a first protocol, e.g., protocol A, into one or more other protocols such as protocols B and C and vice versa. These signals may be converted into protocols B and C, respectively, if devices 213a and 213b are incompatible with protocol A. In one arrangement, computing system 200 may be configured to provide a communication interface for a device management system 215. Device management system 215 may comprise a service provider system configured to monitor and control one or more devices located at a user location. Because device management system 215 might, in one or more configurations, only be compatible with a single communication protocol, computing system 200 may be used to interpret or convert communications formatted according to a variety of protocols (e.g., from devices 213) to the device management system-compatible protocol. In one example, signals received from device 213a in TCP/IP format may be converted into an XMPP or other format compatible with device management system 215 prior to transmission to device management system 215. These signals may include data such as sensor data, status information, user input, commands or instructions and/or combinations thereof. Thus, using such a configuration, computing system 200 may allow a user to turn off a light using a set-top box device by acting as an interpreter between different communication protocols, for example. In another example, computing system 200 may allow a user to view temperature information detected by a home temperature sensor on the user's cell phone by acting as a communication intermediary between the temperature sensor and the user's cell phone. System 200 may store device-protocol compatibility information in, for example, database 211.

Device management system 215 may include components similar to those describe above with respect to computing system 200. Device management system 215 may be configured to modify the operation or an operation parameter of one or more device such as devices 213 upon detection of an event and/or based on a predefined rule. For example, upon detection of the temperature sensed by device 213b reaching a threshold temperature, device management system 215 may transmit a signal to device 213a to automatically lower window shades. The operation parameter in the foregoing example may include the height or position of the window shade. Other examples of operation parameters may include a volume level, an on/off/standby status or operating mode of a device, a temperature level, a time setting (e.g., for an alarm or programmable thermostat) and the like. Device management system 215 may be located at a service provider's location (e.g., service provider network 105 of FIG. 1) and receive device information from computing system 200 in a particular protocol such as XMPP, ZIGBEE, SIP/SIMPLE, Ethernet, Universal Powerline and the like. In one example, the service provider's location may be remote from a user premises where computing system 200 and one or more devices 213 are located. Computing system 200 and devices 213 may be co-located or placed at the same location. This eliminates the need for device management system 215 to understand a variety of protocols. Instead, device management system 215 might only need to understand a single protocol, e.g., protocol A, for communicating with computing system 200. Accordingly, device management system 215 may transmit information, instructions and/or commands to devices 213 in a single protocol format, using computing system 200 as an intermediary translation mechanism.

Further, in one or more arrangements, the functionality of computing system 200 and device management system 215 may be combined into a single device that is resident at either the service provider location or locally at a subscriber location.

According to one or more aspects, a device management system such as system 215 (FIG. 2) is configured to collect information from a variety of devices, including home and user devices to determine whether an action is to be performed. Such actions may include the activation of an in-home device or a non-home device such as a device external to the home, the transmission of a discount offer or other promotional item, transmission of a notification message to a user and the like.

FIG. 3 illustrates a method for monitoring information from multiple home devices and triggering an action based on a predefined rule. In step 300, a device management system may receive a signal from one or more devices in a home or other location. The signal may be formatted according to a protocol compatible with the device management system and include information such as a status of the device, user input (e.g., instructions or commands) through the device, sensor data determined by the device and/or combinations thereof. Devices may be registered with the device management system in various manners as described in further detail herein.

In step 305, the device management system may compare the information received in the signal with one or more predefined rules. The rules may be user-defined or may be defined by a service provider. In one example, a rule may specify that if light and temperature data indicate that a user is not at home, the device control system may automatically activate the security system if it is not already activated. In this example, the predefined rule may state that the action (e.g., turning on of the security system) is to be performed in response to determining that the lights are off, that the temperature is below 65° F., and that the security system is in an unarmed or deactivated state. Device management system may thus compare the information received from client devices such as a light sensor or a lamp, a temperature sensor or thermostat and a security system to the condition parameters of the rule. In step 310, the device management system may determine whether the rule has been triggered. In the above example, if the received device information indicates that the temperature is below 65° F., that the lights are off, and that the security system is unarmed, the rule may be triggered. If the rule has not been triggered, the device management system may continue to monitor the registered devices in step 315.

If, however, a rule has been triggered, the device management system may subsequently determine an action to take in step 320 and a user or device associated with the action to be taken in step 325. For example, using the security system activation example, the device management system may determine that the action to be taken is activation of a device and identify the device to include the security system. The actions and devices may be identified in the rule. In another example, a rule may specify automatically lowering a thermostat to 70° F. when a security system is activated and the lights are turned off. In yet other examples, a rule may provide instructions to offer a user a discount in television services if the user lowers his thermostat to 72° F. or lower or allows his utility usage information to be published to a third party. Such an incentive may be provided by a utilities company to decrease the amount of stress on the company's systems during extreme weather conditions. The rule may be triggered, for instance, if an interior thermostat reading at a home or other building is above 72° F. and an exterior weather gauge indicates a temperature of below 32° F. In such an example, the action to be taken may be identified as transmission of a notification including the incentive and the device may be identified as a cellular phone of the user.

In still another example, sound sensors may provide data to a device management system to indicate a location of occupants of a room or building (e.g., whether a person is upstairs or downstairs). A device management rule may specify an action to automatically transfer any video being watched on a downstairs video rendering device to an upstairs video rendering device upon detecting a change in the occupants' location from downstairs to upstairs. Alternatively or additionally, the device management rule may include an instruction to lower a thermostat for a lower level temperature control zone and to raise the thermostat in an upper level temperature control zone (e.g., during cold weather). Alternatively, the instructions may include raising a thermostat in the lower level temperature zone and lowering an upper level temperature zone (e.g., during warm weather).

Upon determining the action to be taken and the devices associated with those actions, the device management system may generate an appropriate instruction or message in step 330. The message and/or instructions may then be transmitted to an intended recipient device in step 335. The instruction or message may initially be formatted according to a protocol compatible with the device management system and in some instances, with the intended recipient device. However, in one or more arrangements, the protocol might not be compatible with the intended recipient device (e.g., a security system). In such cases, the message may be transmitted through an intermediary interface system such as communication interface 109 of FIG. 1. The communication interface may be configured to automatically translate or convert the message from a current protocol to a protocol compatible with the intended recipient device. In one example, a protocol compatible with the intended recipient device may be stored by the device management system (e.g., system 215 of FIG. 2) and identified to the communication interface (e.g., interface 109 of FIG. 1 or computing system 200 of FIG. 2). Alternatively or additionally, protocol compatibility information may be stored at the communication interface system.

FIG. 4 illustrates a method by which one or more devices may be registered with the device management system and/or the communication interface system. In step 400, a registration system may receive notification of a new device being connected to a network. For example, the network may comprise a network hosted by the communication interface system or device management system. The notification may comprise a polling message automatically sent by the new device to detect other devices on the network. Alternatively or additionally, the registration system may detect the new device sending out periodic or aperiodic polling messages to all devices connected to the network. Upon detection of the new device, the registration system may determine whether the device is compatible with a specified protocol X (e.g., XMPP, ZIGBEE, SIP/SIMPLE, TCP/IP, Z-wave) in step 405. This determination may be made by sending a query to the new device using protocol X and determining if an appropriate reply was received. If the new device is not compatible with protocol X, the registration system may request manual entry of device information such as a serial number, identification of compatible protocols, device type, device capabilities (e.g., sensors, actions, etc.) and the like in step 415. If, on the other hand, the new device is compatible with protocol X, the device information may be requested directly from the device in step 410. Alternatively or additionally, the registration system may attempt communication using other protocols until a response is received from the new device (e.g., finding a protocol that is compatible with the new device). If no response is received from the new device after a set of protocols known to the registration system have been tested or after a certain time period, the registration system may resort to requesting manual entry as described with respect to step 415.

Once the device information has been collected, the registration system may allow a user to configure the device role and permissions in step 420. A device role may include a sender, a receiver or both. A sender includes a device that is configured to transmit information to other devices while a receiver device is configured to receive information from other devices. Thus, in some examples, a device might be designated a receiver if it is only able to receive data but not transmit data. Similarly, if a device is able to send data but not receive data, it may receive a role designation of a sender. Device permissions may include specification of device information or functionality that is allowed to be accessed by other devices. For example, permissions may include a designation of whether device A is allowed to access temperature information of the device and whether device B is permitted to activate a precipitation information collection sensor of the device. In one or more arrangements, device permissions may also include permissions for whether the device is allowed to transmit certain types of information.

In step 425, the registration system may further receive data access privilege or entitlement information for the device. Such information may identify both the information streams which the device is authorized to receive as well as the devices authorized to access the new device's information stream. One example of a data stream is a utilities information stream that distributes information regarding the utilities being used in a particular location and/or by a particular individual as determined by devices connected to the network. Devices may also be assigned roles such as listener or contributor or both in the stream. Thus, a cell phone used to monitor electricity usage may be authorized to access the information stream as a listener but not a contributor since the cell phone might not produce utilities usage information. A thermostat, on the other hand, may be authorized to access the information stream as a contributor but not a listener if the thermostat is not used to process utility information of other devices. In step 430, the registration system may store the registration information and configuration of the new device and transmit confirmation of such to a user and/or the new device.

FIGS. 5A & 5B illustrate a series of interfaces through which a new device may be registered and configured. In FIG. 5A, interface 500 may be configured to receive information including device name 501, device type 503, device driver 505 and compatible protocols 509. Device name 501 may comprise a text input field, allowing a user to manually specify the device name. Device type 503 may be specified using browse function 507a, selection of which may cause a pop-up window or other interface to be displayed. Through the pop-up window or other interface, a user may select one or more predefined device types (e.g., X brand light switch, Model S Security System). The use of predefined device types may allow the registration system to use predefined configuration information and settings for each particular type of device. In one or more arrangements, device driver 505 may be automatically populated upon selection of a device type. Alternatively or additionally, a user may override the automatically selected driver or otherwise enter a preferred driver by selecting browse function 507*b*. The user may then be provided with a browsing window through which the user may identify the appropriate driver file. Protocol selection 509 may be performed through a selection window 511 that lists the protocols known or available to the registration system. The user may be allowed to select one or more of the protocols as appropriate. If the user makes one or more mistakes or wishes to start over, reset option 513 may be used. Alternatively or additionally, the user may save the registration information using option 515 and continue to a next configuration screen using option 517 once the registration information is finalized and confirmed.

FIG. 5B illustrates interface 520 that may, in one or more arrangements, be displayed as a configuration interface following interface 500 (e.g., upon selection of continue option 517 of FIG. 5A). Configuration interface 520 may include options for selecting device role 521 and setting device permissions 523. Device role 521 may be selected using a drop down menu listing the available role settings while permissions 523 may be configured using controls 529 and 531. For example, delete control 529 may delete a device from the list while add control 531 may be used to add a device for which permissions are to be specified or customized. If the permission settings for device 1 525*a* or device 2 525*b* need to be further modified, the user may use one of modification options 527 corresponding to the device for which settings are to be changed. If a device is not listed under permissions 523, the device may be considered to have a default set of permissions. In one example, the default set of permissions may include permission to access all data and functionality.

Figure 6:
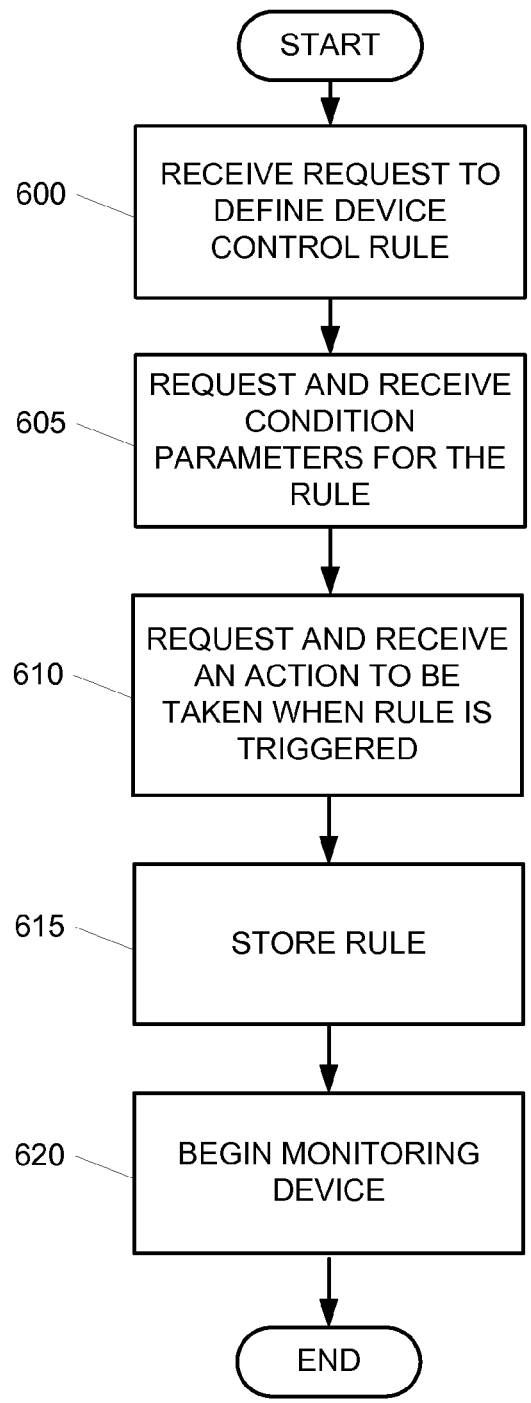
FIG. 6 is a flowchart illustrating an example method for defining a device control rule according to one or more aspects described herein.

FIG. 6 illustrates a method by which device control rules may be configured according to one or more aspects described herein. In step 600, a device control system may receive a request to define a device control rule. In response, the system may request and receive condition parameters that are to be satisfied under the rule in step 605. Condition parameters may include a temperature threshold, an activation status of a system (e.g., security system, a television, a computer), a time of day, reception of user input, status of a door (e.g., open or closed) or a lock thereof, and/or combinations thereof. In one example, conditions for a rule may include the time being between the hours of 9 AM and 6 PM and the temperature setting being above 70° F.

Once the rule conditions have been defined, the device control system may further request and receive an action to be taken when the rule is triggered or satisfied in step 610. The action may further include identification of one or more devices and an operation parameter thereof that is to be modified and/or identification of a user to which a message is to be sent. In one example, the action may be defined as lowering the volume on television or other content rendering device in response to determining that a user's cell phone is located in a vicinity of the television (e.g., in the same house or building) and the user's cell phone is receiving a telephone call.

In step 615, the rule may be stored upon the various parameters being defined. The rule may be stored in association with the one or more devices to which it is applicable. Using such a storage mechanism, the device control system may look-up applicable rules based on the devices from which information is being received and/or to which information is to be transmitted. Accordingly, the device control system might not need to parse through all stored rules, even those that do not relate to the devices transmitting status information. In step 620, the device control system may begin monitoring the signal transmitted by devices in the network to determine if a rule has been triggered.

Figure 7:
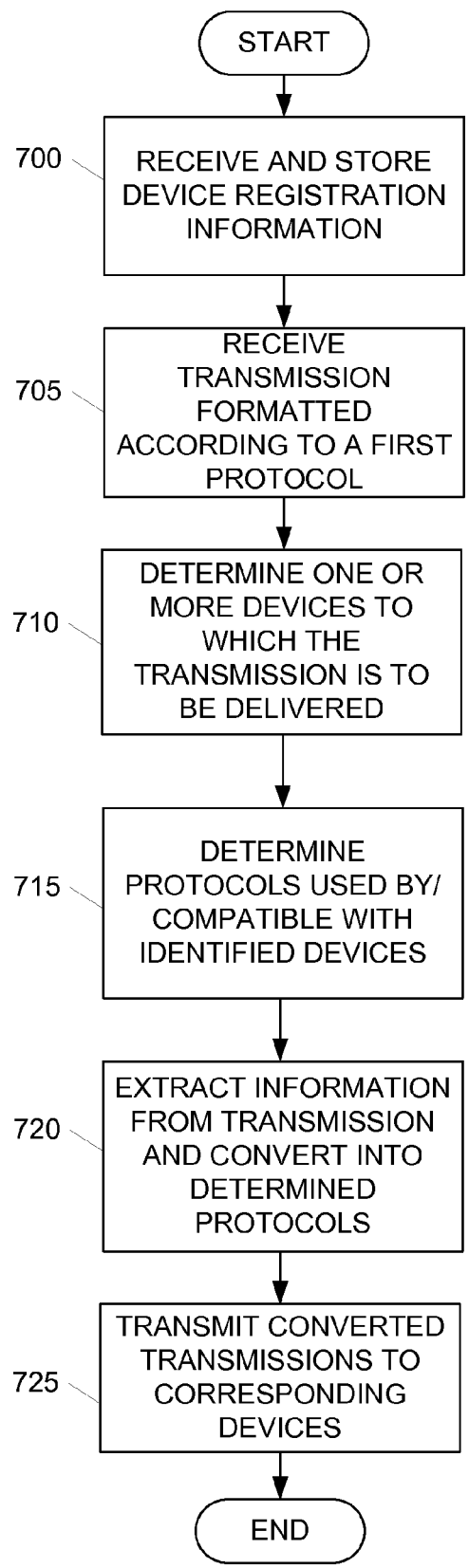
FIG. 7 is a flowchart illustrating an example method for facilitating communication among devices according to one or more aspects described herein.

In some arrangements, a device control system such as system 215 of FIG. 2 might only be compatible or be able to understand a single communication protocol. However, the devices that the system controls may communicate in a variety of protocols. Accordingly, a translation or conversion process may be used to provide signals and information to and from the device control system and the devices based on compatibility. FIG. 7 illustrates a method whereby a communication interface (e.g., computing system 200 of FIG. 2 and/or interface 109 of FIG. 1) includes protocol conversion functionality. For example, the communication interface may receive a signal in a first protocol format and modify the signal into a second protocol format prior to delivery of the signal to a recipient device. In step 700, the communication interface may receive and store registration information including protocol compatibility information from each of the devices in the network. In step 705, the communication interface may receive a transmission formatted according to a first protocol from a first device in the network. For example, the transmission may be received from a microwave, where the transmission is formatted according to a Z-WAVE control protocol. In another example, the transmission from the microwave may be formatted according to SIP/SIMPLE or ZIGBEE communication protocol.

In step 710, the communication interface may determine one or more second devices to which the transmission is to be delivered. This determination may be performed using address information in the transmission or, alternatively or additionally, data access privilege or entitlement information. For example, if devices 2, 3 and 4 are all authorized to access a service for monitoring the status of device 1, the destination devices for the transmission may be identified as devices 2, 3 and 4. In one or more configurations, determination of destination devices may also be based on a content of the transmission and/or permission settings. For example, if device 2 is authorized to access a service for monitoring the status of device 1, but permission settings of device 1 disallows the transmission of status information to device 2, device 2 might not be identified as a destination device for the transmission.

Once the destination devices have been identified, the communication interface may, in step 715, determine the protocols used or preferred by each of the identified devices. The communication interface may then convert the transmission into each of the determined protocols in step 720. In one example, the communication interface may extract the information communicated using ZIGBEE or IRDA communication protocol and reformat or re-packetize the data according to a second protocol such as SIP/SIMPLE. The converted signal may then be transmitted to their corresponding destination devices in step 725. As noted herein, the process described with respect to FIG. 7 allows a device such as a device control system to use a single communication interface in communication with a variety of other devices that might not operate using the same protocols. Accordingly, the device control system may expand its reach and application regardless of communication protocol compatibility.

The methods and features recited herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
    receiving, at a user premises device management system, a first signal from a first user premises device indicative of a condition associated with the first user premises device;
    receiving, at the user premises device management system, a second signal from a second user premises device indicative of a condition associated with the second user premises device;
    determining, by the user premises device management system, a rule based on the condition associated with the first user premises device and the condition associated with the second user premises device, wherein the rule associates the condition indicated in the first signal and the condition indicated in the second signal to a modification to an operation parameter of a third user premises device different from the first user premises device and the second user premises device, wherein the modification to the operation parameter of the third user premises device is different from the condition associated with the first user premises device and is different from the condition associated with the second user premises device;
    accessing device permissions for the third user premises device, wherein the device permissions specify whether the operation parameter of the third user premises device is modifiable by other devices; and
    generating and transmitting, by the user premises device management system, a third signal to the third user premises device, wherein the third signal comprises an instruction to modify the operation parameter of the third user premises device in accordance with the rule.

2. The method of claim 1, wherein the third user premises device comprises a multimedia presentation device and wherein modifying the operation parameter of the third user premises device comprises modifying a manner in which a content item is presented.

3. The method of claim 1, wherein the first, second and third user premises devices are located remotely from the user premises device management system.

4. The method of claim 1, wherein the condition associated with the first user premises device indicates at least one of a presence of an occupant in a user premises and a location of an occupant in a user premises.

5. The method of claim 1, wherein the first signal and the third signal are provided using the same protocol.

6. The method of claim 1, wherein the first and third user premises devices communicate using different protocols and wherein the first signal is received from a protocol conversion system and the third signal is transmitted to the third user premises device through the protocol conversion system.

7. The method of claim 6, wherein the protocol conversion system is co-located with at least one of the first, second, and third user premises devices and wherein the user premises device management system is located remotely from the protocol conversion system.

8. The method of claim 1, wherein prior to receiving the first signal, the method further comprises:
    receiving, at the user premises device management system, registration information for the first user premises device; and
    receiving, at the user premises device management system, information defining the rule based on the condition associated with the first user premises device.

9. The method of claim 8, wherein the registration information comprises a designation of the first user premises device as at least one of: a sender device configured to send signals to the user premises device management system and a receiver device configured to receive signals from the user premises device management system.

10. The method of claim 1, wherein the condition indicated by the first signal comprises a user premises being devoid of occupants and wherein the instruction carried in the third signal specifies at least one of: lowering a temperature and raising the temperature of the user premises.

11. The method of claim 1, wherein the third user premises device comprises a mobile device, and wherein the modification to the operation parameter of the third user premises device comprises displaying a message that prompts a user to take action.

12. The method of claim 11, wherein the message indicates an incentive for the user to take action.

13. A method comprising:
    receiving, at a user premises device management system, device registration information for a first user premises device, a second user premises device, and a third user premises device;
    assigning, by the user premises device management system, the first user premises device and the second user premises device a role comprising at least one of: a sender device configured to send signals to the user premises device management system and a receiver device configured to receive signals from the user premises device management system;
    assigning, by the user premises device management system, device permissions for the third user premises device, wherein the device permissions specify whether an operation of the third user premises device is modifiable by other devices; and
    receiving and registering a user specified rule defining an action to take upon detection of a condition associated with the first user premises device and a condition associated with the second user premises device, wherein the action comprises transmitting an instruction to the third user premises device different from the first user premises device and the second user premises device to modify the operation of the third user premises device, wherein the operation of the third user premises device to be modified is different from the condition associated with the first user premises device and the condition associated with the second user premises device.

14. The method of claim 13, further comprising:
assigning device permissions for the first user premises device and the second user premises device, wherein the device permissions specify at least one of device information that is accessible by other devices and device functionality that is accessible by other devices.

15. The method of claim 14, wherein the device permissions are defined by a user.

16. The method of claim 13, wherein the device registration information comprises a protocol in which the first user premises device communicates.

17. The method of claim 13, wherein the first and third user premises devices communicate using different protocols and wherein the device registration information is received from a protocol conversion system different from each of the first and third user premises devices and the user premises device management system.

18. A method comprising:
receiving, at a communication interface system, a first signal from a first device, wherein the first signal is formatted according to a first protocol and indicates an operational change of the first device;
receiving, at a communication interface system, a second signal from a second device, wherein the second signal is formatted according to a second protocol and indicates an operational change of the second device;
converting the first signal into a third protocol different from the first protocol;
converting the second signal into the third protocol different from the second protocol;
transmitting, from the communication interface system, the first signal and the second signal to a device management system according to the third protocol, wherein the device management system is located remotely from a user premises and is configured to determine a modification to an operation of a user premises device, different from the first device and the second device, based on the operational change of the first device and the operational change of the second device, wherein the modification to the operation of the user premises device is different from the operational change associated with the first device and the operational change associated with the second device;
receiving a third signal from the device management system in response to the first signal and the second signal, the third signal comprising an instruction to perform the modification to the operation of the user premises device, wherein the third signal is transmitted based on accessed device permissions for the user premises device, the accessed device permissions specifying whether the modification to the operation of the user premises device is modifiable by other devices;
converting the third signal from the third protocol to a fourth protocol; and
transmitting the third signal to the user premises device according to the fourth protocol.

19. The method of claim 18, further comprising:
receiving, at the communication interface system, a fourth signal from the user premises device, the fourth signal communicated according to the fourth protocol;
converting the fourth signal into the third protocol; and
transmitting the fourth signal to the device management system in the third protocol.

20. The method of claim 18, further comprising:
transmitting device registration information for each of the first device, second device, and user premises device to the device management system; and
transmitting, to the device management system, a rule specifying the modification to the operation of the user premises device to be performed when the operational change of the first device is detected.

* * * * *